(No Model.)
J. STANLEY.
BRIDLE BIT.
No. 249,113.  Patented Nov. 1, 1881.
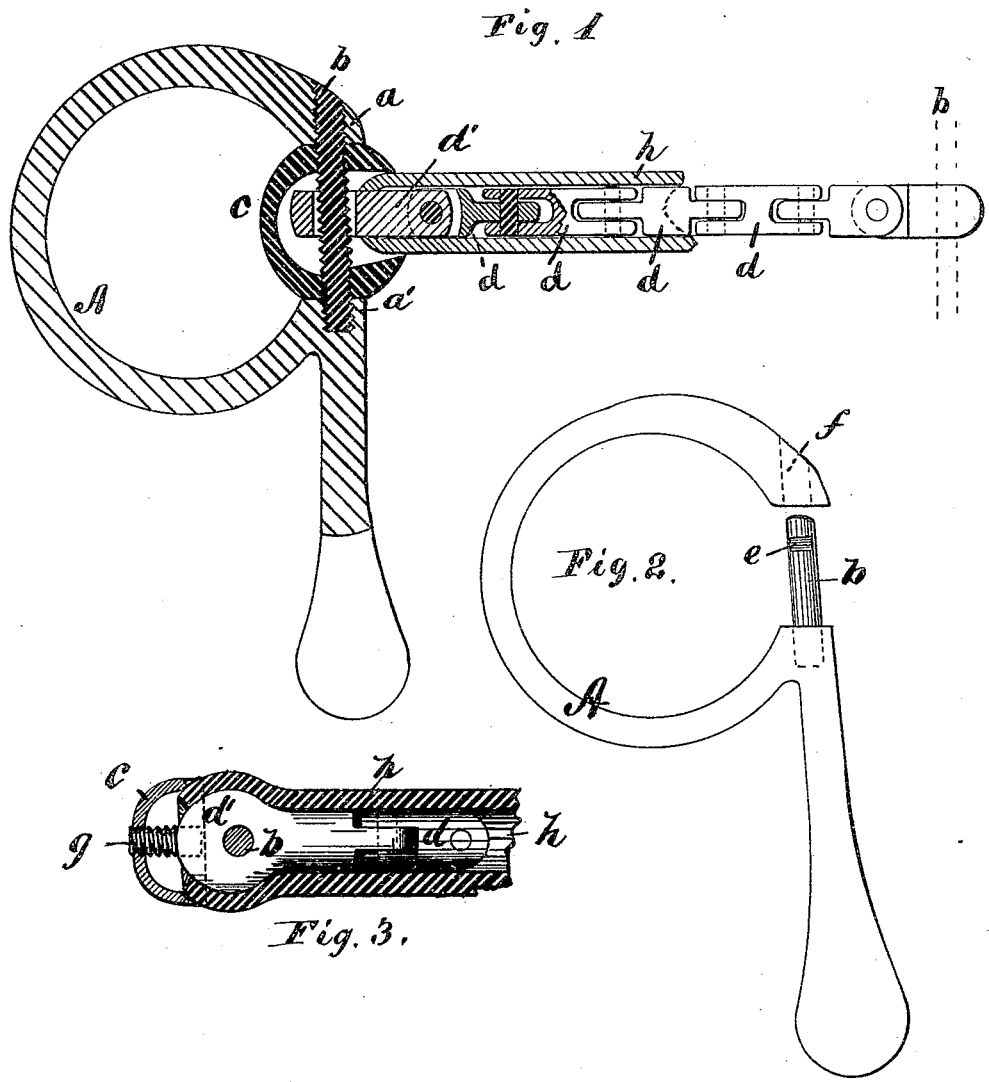
Witnesses:
Charles H. Pell.
Charles W. Ward.
Inventor:
James Stanley.
by O. Drake, Atty.

UNITED STATES PATENT OFFICE.

JAMES STANLEY, OF NEWARK, NEW JERSEY.

BRIDLE-BIT.

SPECIFICATION forming part of Letters Patent No. 249,113, dated November 1, 1881.

Application filed February 5, 1881. (No model.)

*To all whom it may concern:*

Be it known that I, JAMES STANLEY, of Newark, in the county of Essex and State of New Jersey, have invented certain new and useful Improvements in Bridle-Bits; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates more particularly, though not exclusively, to bits having a flexible mouth-piece covered with a tube of india-rubber or other flexible material, the object being to increase the utility of the bit, to impart additional beauty thereto, to protect the ends of the rubber tube, and to reduce the cost of construction.

It consists in the structural arrangement and combination of the several parts, which will be hereinafter fully and definitely set forth and finally claimed.

Referring to the accompanying drawings, in which similar letters of reference indicate like parts in each of the several figures, Figure 1 is a sectional view of one side of a bit embodying my improvements, in which the arrangement of the different parts and their relation to one another are clearly indicated. Figs. 2 and 3 are detail modifications which will be duly described.

Heretofore in the manufacture of this class of bits the ends of the rubber tubing have been very imperfectly secured and protected in the heads, the latter having, if anything, only a slight recess or groove for the reception of the ends of the tubing, they being otherwise solid, and hence heavy and cumbersome. In my improved bit the heads are entirely hollow or dish-shaped, forming a mere shell, and very light, so that the cheek-pieces may pass through the hollow instead of the solid portion of the heads, as heretofore, their form and construction being such as to adapt them to thoroughly cover the ends of the tubing for some distance, as well as to clamp and so afford ample protection to the same. Other means for securing the ends of the tubing are also provided, as will further appear.

In carrying out my invention I construct cheek-pieces A in the manner shown in Figs. 1 and 2. Between the jaws $a$ $a'$ thereof, which are connected together by a screw, pin, or shank, $b$, are placed metallic hollow heads or caps $c$, said pin $b$ passing through said hollow heads or caps, as shown, and so forming a means for securing the hollow head or cap and mouth-piece of the bit to the cheek-piece. The mouth-piece of the bit is formed in riveted and pivoted sections $d$ $d$ $d$, so formed as to produce substantially a universal joint, the rivets preventing the sections from expanding and contracting longitudinally, by which action a considerable wear is caused upon the covering. The links or sections are further formed of thick substantial metal between the joints, producing a solid foundation for said covering, all of which will appear upon reference to Fig. 1. Said covering $h$ is formed from rubber tubing, which may be adjusted over the sections, or, under some circumstances, cast or molded around the same, or the tubing may be formed from other flexible material than rubber. The ends of said tubing are inclosed and covered by above-mentioned heads or caps $c$, which produces a very neat finish, as well as firmly secures the rubber in position and protects the ends thereof.

The jaws of the cheek-pieces may be secured by a simple riveting process, as commonly done, or they may be screwed together, as in Fig. 1, or notches $e$ may be formed near the end or ends of the pin $b$, and after being inserted in the perforations $f$ in the jaws the said jaws may be subjected to pressure in suitable dies, which action presses the metal of said jaws into said notches, thereby securing the parts together, as will be readily understood.

As a modification of my device, I can cast or otherwise form the sections $d'$, connected with the cheek-piece, with a bulging headed extremity, as shown in Fig. 3. Said head receives the rubber covering $h$, which may be split to receive it, and it is then secured between the jaws $a$ $a'$. In this case the hollow head $c$ is secured upon the end of the bulging section $d'$, covering the split in the tubing by the screw $g$, embedded in said head, or by other means, and holds the ends of the tubing securely and neatly, as before.

The heads or caps $c$ may be formed of other material than the metal—as, for example, celluloid, hard rubber, or any appropriate substance capable of being adjusted over the ends of the tubular covering to hold and finish the same.

In Fig. 3, as will be observed, a hollow head or cap is secured to the metal mouth-piece by means of a shank, $g$. It will be manifest, however, that the said parts may be secured by means of riveting, and the screw-thread dispensed with or not, as may be desired. It will further be observed that provision is made for securing the cheek-pieces without having the pin or shank $b$ of said cheek-pieces pass through the hollow heads.

In the manufacture or repair of the bit, it may become necessary to draw the rubber or other material from which the outer covering is formed back to the rivets which join the sections to manipulate the same. By my construction of the bit this can easily be accomplished, after which the rubber springs back or is drawn back into the hollow head; or, should it be desired to replace the old covering by a new one, the said covering may be drawn back to one of the end rivets, which being punched or drilled out, the rubber covering can be taken off and a new one substituted therefor. Said new covering may be drawn back to allow the disconnected sections to be reriveted, after which it will spring back over the joint and be adjusted within the hollow head, as before.

Having thus described my invention, what I claim, and wish to secure by Letters Patent, is—

1. The combination, with a flexible mouth-piece formed of sections covered with tubing, of cheek-pieces A, hollow heads $c$, and pins $b$, uniting the jaws of said cheek-pieces, as and for the purposes set forth and shown.

2. In a bit, the combination of a jointed flexible mouth-piece having a rubber or other flexible covering, and hollow heads or caps adapted to receive and clamp the ends of said covering, as and for the purposes set forth and shown.

3. In a bit, hollow heads carrying the cheek-pieces, said heads having portions, as $d'$, projecting therefrom and pivoted to a flexible metallic mouth-piece, substantially as and for the purposes set forth.

4. In a bit, the combination, with a mouth-piece formed in sections connected together, of a tubular covering and means for securing the same at the ends, said sections being joined, so as to allow of substantially a universal action, and having the portions between the pivoted parts conformed to said tubular covering, the whole being arranged and operating substantially as and for the purposes set forth and shown.

5. In combination, in a bit, cheek-pieces A, having jaws $a$ $a'$, a pin or shank, $b$, connecting said jaws, hollow heads $c$, and mouth-piece adjusted therein, formed of sections covered with a covering, $h$, all the parts being adapted to operate substantially as and for the purposes set forth and shown.

6. A bridle-bit composed of a jointed flexible metallic mouth-piece, hollow heads or caps carrying cheek-pieces, and adapted to be secured to the flexible mouth-piece, an elastic tube adapted to cover said mouth-piece and to enter and be clamped or secured in said hollow heads, substantially as and for the purposes set forth and shown.

7. The combination, in a bit having a flexible metallic mouth-piece and hollow heads secured thereon, of cheek-pieces adapted to pass through the hollow portion of said heads, a flexible tube adapted to cover said mouth-piece and enter into and be clamped by the said hollow heads, substantially as and for the purposes set forth and shown.

8. The combination, in a bit, of hollow heads adapted to be secured to the ends of the mouth-piece thereof, a flexible tube adapted to cover said mouth-piece and enter the hollow heads, and cheek-pieces adapted to pass through both the flexible covering and the mouth-piece, thus securing the two together at the ends, substantially as and for the purposes set forth and shown.

9. The combination, in a bit, of a mouth-piece adapted to receive hollow heads on the ends thereof, a flexible tube adapted to cover said mouth-piece and enter the hollow heads, and means, as described, for securing the ends of said tube to prevent their accidental withdrawal from said hollow heads, substantially as and for the purposes set forth.

In testimony that I claim the foregoing I have hereunto set my hand this 28th day of January, 1881.

JAMES STANLEY.

Witnesses:
 OLIVER DRAKE,
 CHARLES H. PELL.